United States Patent
Koch et al.

[11] Patent Number: 5,813,640
[45] Date of Patent: Sep. 29, 1998

[54] REMOVABLE LICENSE PLATE HOLDER AND MOUNTING SYSTEM

[76] Inventors: Albert C. Koch, Grapevine Canyon Rd., Inyokern, Calif. 93527; Donald C. Gay, 608-B W. Perdew Ave., Ridgecrest, Calif. 93555-2569

[21] Appl. No.: 297,689

[22] Filed: Aug. 29, 1994

[51] Int. Cl.⁶ ................................................. G09F 21/04
[52] U.S. Cl. ...................... 248/222.11; 40/200; 40/209
[58] Field of Search ................... 248/222.11; 40/200, 40/209, 201; 411/41, 45, 46, 48, 60, 542

[56] References Cited

U.S. PATENT DOCUMENTS

| | | | |
|---|---|---|---|
| 1,402,702 | 1/1922 | Zint | 40/201 |
| 1,757,587 | 5/1930 | Quinn . | |
| 1,877,075 | 9/1932 | Stephenson . | |
| 2,526,460 | 10/1950 | Crocella | 40/209 X |
| 2,831,280 | 4/1958 | McCulley | 40/125 |
| 2,916,842 | 12/1959 | Mushynski | 40/202 |
| 3,053,046 | 9/1962 | Fleming, Jr. | 411/60 |
| 3,192,821 | 7/1965 | Siebol | 411/41 |
| 3,340,639 | 9/1967 | Savage | 40/209 |
| 3,374,568 | 3/1968 | Trammell | 40/209 |
| 3,430,376 | 3/1969 | Drybread | 40/209 |
| 3,584,407 | 6/1971 | Vrooman | 40/209 |
| 4,736,539 | 4/1988 | Dickinson | 40/200 X |
| 4,917,426 | 4/1990 | Copp | 293/142 |

FOREIGN PATENT DOCUMENTS

| | | | |
|---|---|---|---|
| 248728 | 12/1963 | Australia | 411/46 |
| 163876 | 6/1921 | United Kingdom | 40/200 |
| 2047452 | 11/1980 | United Kingdom | 40/200 |

*Primary Examiner*—Ramon O. Ramirez
*Assistant Examiner*—Anita M. King

[57] ABSTRACT

Improved devices and methods for mounting a license plate on a vehicle are described. The mounting system of the invention includes a mounting bracket having a horizontal base portion adapted to extend underneath an overhanging portion of a vehicle, such as a bumper or grillwork. The base portion includes cut-outs and tabs, if required, to accommodate mounting to a particular model of truck, automobile or bus or an adjustment system to allow mounting holes to be moved so as to accommodate mounting on a variety of vehicles. Fasteners adapted to interact with holes in the horizontal underside of the portion of the vehicle to which the bracket will be mounted are provided. These fasteners are installed without tools and can be released without tools, if desired. The mounting system can be made either removable by hand or more permanent, being installed by hand but requiring tools and effort to remove it.

18 Claims, 12 Drawing Sheets

REMOVABLE LICENSE PLATE HOLDER AND MOUNTING SYSTEM

BACKGROUND OF THE INVENTION

1. Field of the Invention

This invention relates generally to license plate holders for vehicles, such as automobiles, trucks and buses. More particularly, the invention concerns a license plate holder that can be conveniently installed without tools, and which, in one embodiment, can be made to be removable, also without tools if desired.

2. Description of Related Art

In the operation of many vehicles it is desirable, and in most instances required by law, to display a license plate on the vehicle. Various brackets for holding such license plates and systems for attaching them to the body or bumper of a vehicle have been devised. However, the focus of such devices was to permanently affix the license plate to the vehicle using fasteners requiring tools to fasten. Usually a license plate is fastened within a holder by some means, usually involving a screw fastener or a threaded bolt and nut or the like. The holder is then mounted on the vehicle by means of a screw fastener or nut and bolt tightened in or through one or more holes made in the body or bumper of the vehicle.

Particularly as to automobiles and trucks sold in the United States, mounting holes are not always provided in the front of the vehicle. This is due, at least in part, to the varying requirements from state to state on display of a license plate on the front of the vehicle. Alternatively, in the case where the car in question is of foreign origin and the country of manufacture does not require a front plate, provision for one may not be provided. Most manufacturers provide front mounting brackets to dealers in the states that require front as well as rear license plates to allow them to install brackets for a front plate after delivery of the vehicle.

This process usually involves a mechanic drilling holes in the body of the vehicle or the bumper, and inserting bolts or screws through the mounting bracket into the newly drilled holes in the vehicle. Many customers object to this, and do not want to see holes drilled in a new vehicle. Moreover, the car or truck may be purchased in a state requiring front license plates and later moved to and driven in a state that does not. The owner wishing then to remove the front license plate holder is frustrated by unsightly holes left in the body or bumper of the vehicle.

It has been recognized that a mounting system that would not leave unsightly holes would be desirable to many vehicle purchasers. Moreover, other specialty uses of license plates involving numerous changes from vehicle to vehicle make conventional mounting techniques cumbersome, and also leave such unsightly holes. For example "dealer plates" that are frequently transferred between vehicles fall in this class, as do "agricultural vehicle" plates. A farmer, for example, may designate a truck an agricultural vehicle, such designation severely limiting use on public streets and highways, but in a later year need the truck to deliver produce to distant points and change the registration of the truck for that purpose, for example. It would be desirable to make changing the license plates a simple matter in such instances.

As mentioned, prior license plate holder systems conventionally involve screw or threaded fasteners, and therefore require the use of tools in mounting them to the vehicle or removing them therefrom. Particularly in cases where the license plate is to be periodically removed, a mounting system which does not require tools would be advantageous. Moreover, even in more permanent mountings, to be able to do so without tools would benefit vehicle owners who install license plate holders themselves, as well as dealers who install such license plate holders after the vehicle is shipped from the manufacturer.

Those skilled in the art will appreciate that desirable attributes of a license plate mounting system include being able to affix the mounting bracket without drilling visible holes in the vehicle body or bumper for example. Being able to mount such a bracket without tools, and to make such mount relatively permanent, or instead a releasable mount for easier transferring of the license plate are also desirable for example. The present invention addresses these concerns.

SUMMARY OF THE INVENTION

Briefly, and in general terms, the present invention provides an improved license plate bracket mounting system which can be used to mount a license plate to a vehicle without the use of tools. The mounting system includes a bracket with a horizontal flange, which extends underneath an overhang on a vehicle, and manually fastenable fasteners, which may be releasable fasteners, that interfit with existing holes in a surface underneath the overhang, as are found in the underside of surfaces of bumpers and grillework. The horizontal flange is adapted to fit into the grillework, or under the bumper, as required for each vehicle to which it will be mounted, the base portion being notched or tabs added, if needed, as required to engage or conform to the geometry of the front or rear portion of the vehicle to which it is mounted.

In a more detailed aspect, the releasable fasteners include snap-in-place bushings to be inserted in existing holes in the vehicle having an inner diameter of selected size. An expandable grommet having at selected outside diameter which fits inside said bushing is located and captively held in each of the one or more holes in the flange positioned to align with the location of the one or more existing holes in the vehicle. A manually actuateable plunger is located in and inserted only a short distance into each of the one or more grommets from a bottom side and captively held therein. The plunger is adapted to expand the grommet when it is fully inserted therein. To install the license plate holder of the invention the flange is brought into close contact with the underside surface where said bushings have been inserted in said existing holes, and the grommet and plunger assemblies are then inserted into said bushings. The partially inserted plunger in each grommet and plunger assembly is then fully inserted into each of the grommets. The plunger expands the grommet within the bushing to give a firm attachment. All of these steps are done by hand.

In another detailed aspect, the plunger may have a grippable proximal end, which can be grasped and retracted, releasing the grommet from the bushing. Providing this configuration on all the fasteners used to mount said flange of the mounting bracket to the vehicle allows the bracket to be easily removed therefrom if desired, and again replaced if desired. Furthermore, degradation of the firmness of the attachment is minimal, but if it should occur, replacement of any of the component parts of the fastening system is a simple matter when the mounting bracket is not attached as the frictional resistance occasioned by the radially outward compressive force exerted on the other connection parts by the inserted plunger is relieved and the bushing or the grommet can be removed from their respective mounting holes.

In a further detailed aspect, the releasable fastener could be given a proximal end configuration which facilitates insertion but does not allow grasping to be retracted. This makes the mounting of the bracket of the invention simple and negates the necessity for tools, while providing a more permanent attachment which can only be undone by using tools. For example a conical proximal end can be grasped and forced inward, but is very difficult, if not to say impossible to grasp to pull outward if significant resistance must be overcome, which is the case with the mounting bracket of the invention. Alternatively, a flat or rounded proximal end that terminates the plunger at a point even with the grommet when fully inserted would be very difficult to remove without tools, yet could be inserted without undue difficulty by hand.

In a still further aspect, releasable clips are used to attach a license plate to the bracket of the invention. These clips are likewise insertable without the use of tools, However, they are quite difficult to remove without tools.

In a further detailed aspect, the license plate mounting system of the invention can be made to accommodate irregularly spaced or non-symmetrical holes, by providing adjustable locations for the grommets through the base portion of the mounting bracket.

In still another aspect the configuration of the license plate holder of the invention allows conventional screw or other threaded fasteners to be used, by placing a snap-in anchor in the existing holes in the vehicle and screwing in a conventional screw, or drilling new holes and using conventional fasteners. Since the holes are drilled in a bottom portion of the bumper or other grille or bodywork, such holes will be hidden from view unless the observer is both low enough and close enough to the vehicle to see under the grillework or bumper.

Other features and advantages of the invention will become apparent from the following detailed description, taken in conjunction with the accompanying drawings, which illustrate, by way of example, the features of the invention.

DETAILED DESCRIPTION OF THE PREFERRED EMBODIMENTS

Figure 1:
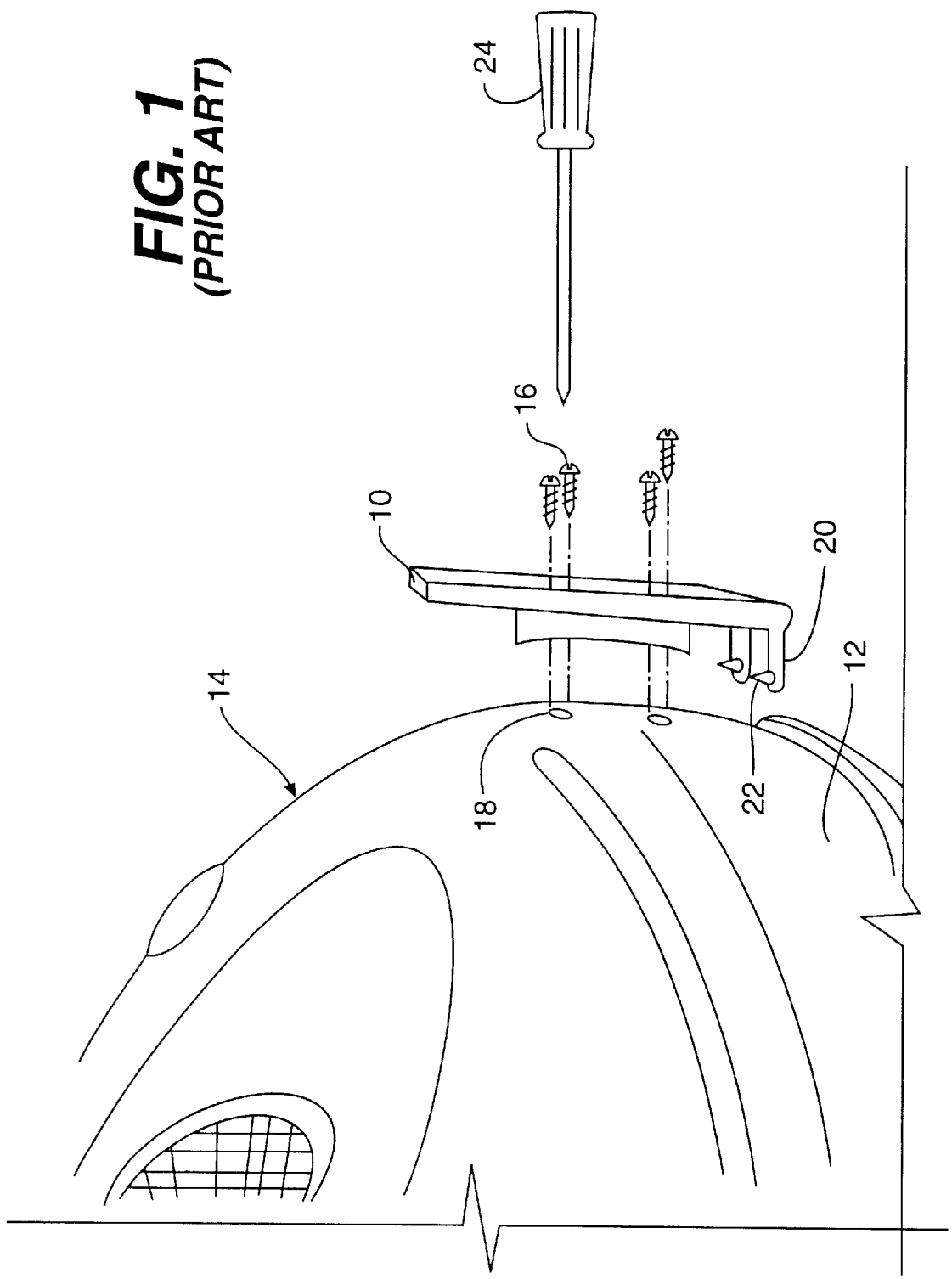
FIG. 1 is an exploded perspective view of a license plate holder of conventional design and the system of mounting on a front bumper of a vehicle, and identifies it as prior art.

As shown in FIG. 1 of the drawings, which are provided for purposes of exemplary illustration, a typical prior art license plate holder 10 is mounted to the front bumper 12 of a vehicle 14 by means of screw fasteners 16 placed in holes 18 drilled into the vehicle. Flanges 20 having alignment pins 22 are sometimes provided to interfit with existing holes (not shown) in a bottom surface of said bumper 12. A tool, such as a screwdriver 24 is required to mount the license plate holder 10.

Figure 2:
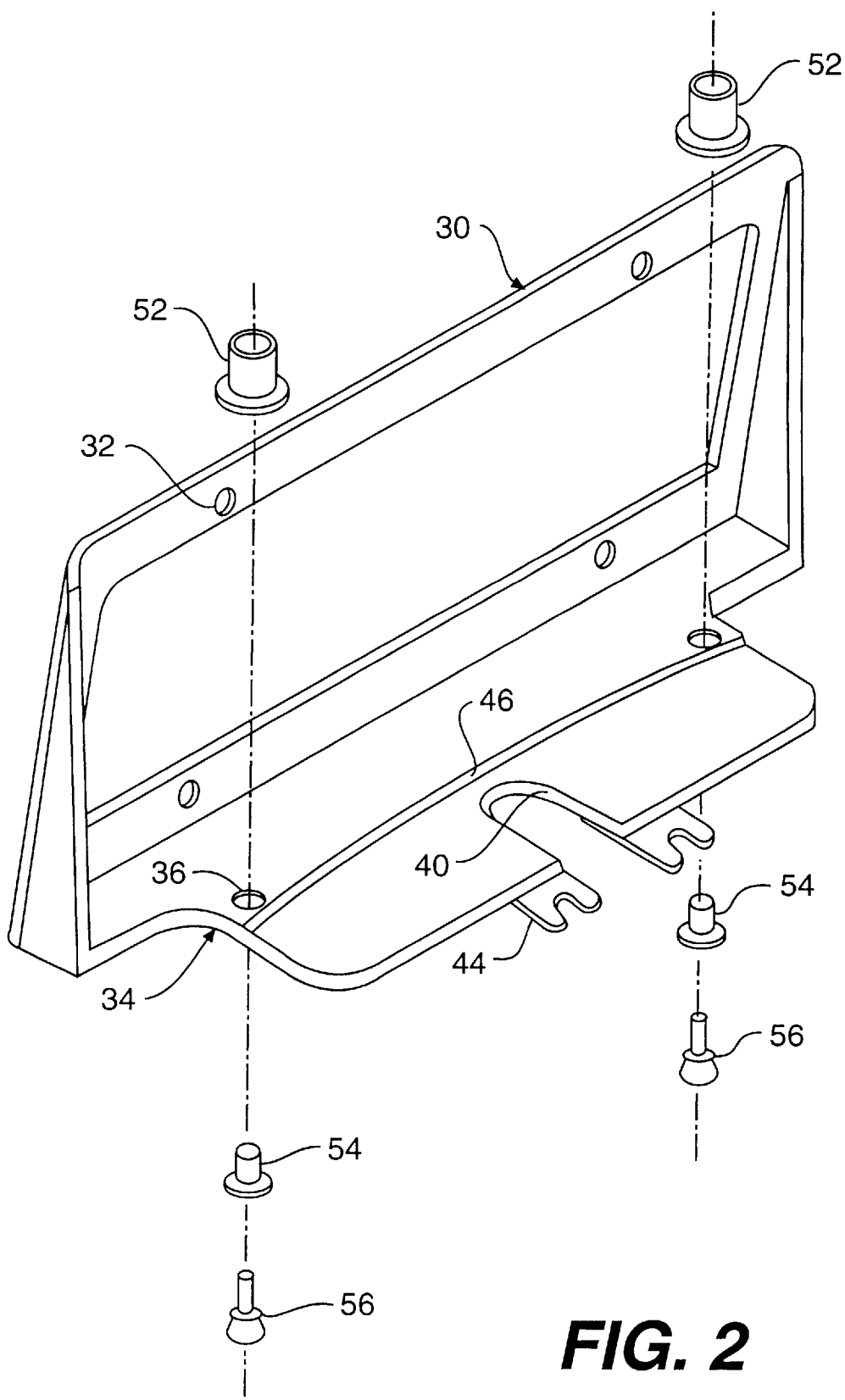
FIG. 2 an exploded perspective view of an embodiment o the invention showing the releasable fasteners.
Figure 3:
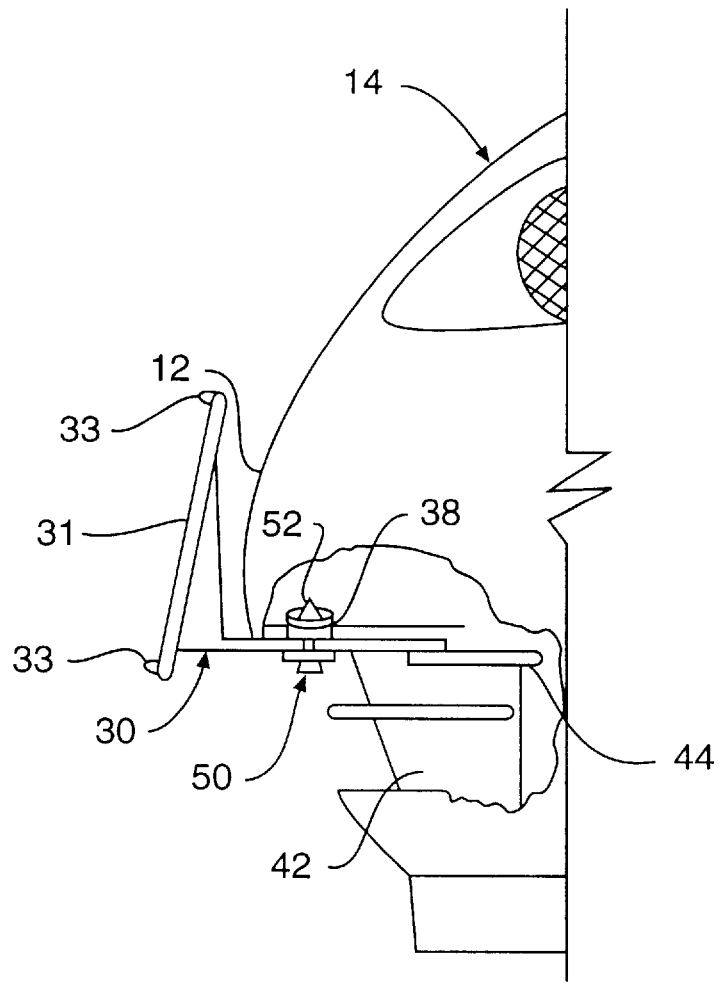
FIG. 3 is an elevational view, partially in section, of a license plate mounting system of the invention attached to a vehicle.

Turning to FIGS. 2 and 3, the mounting system of the invention in one embodiment comprises a mounting bracket 30 having a general configuration adapted to support a license plate 31, and optionally a license plate cover (not shown) if desired, of conventional configuration. Openings 32 in the bracket are provided for fasteners 33 adapted for attaching such a license plate or holder to the bracket 30. A horizontal flange 34 is incorporated in the bracket, and holes 36 defined in this flange are positioned so as to align with existing holes 38 in a vehicle 14.

The horizontal flange in this embodiment has a configuration defining a cut-out 40 to allow a clearance for a central strut 42 intersecting the bottom surface of a bumper 12 at the mounting location on the vehicle 14. Additionally, slotted tabs 44 and a curved surface 46 are provided to interfit with further structure on a particular vehicle to further stabilize the mounting bracket 30 when it is fastened to the vehicle 14.

Figure 4:
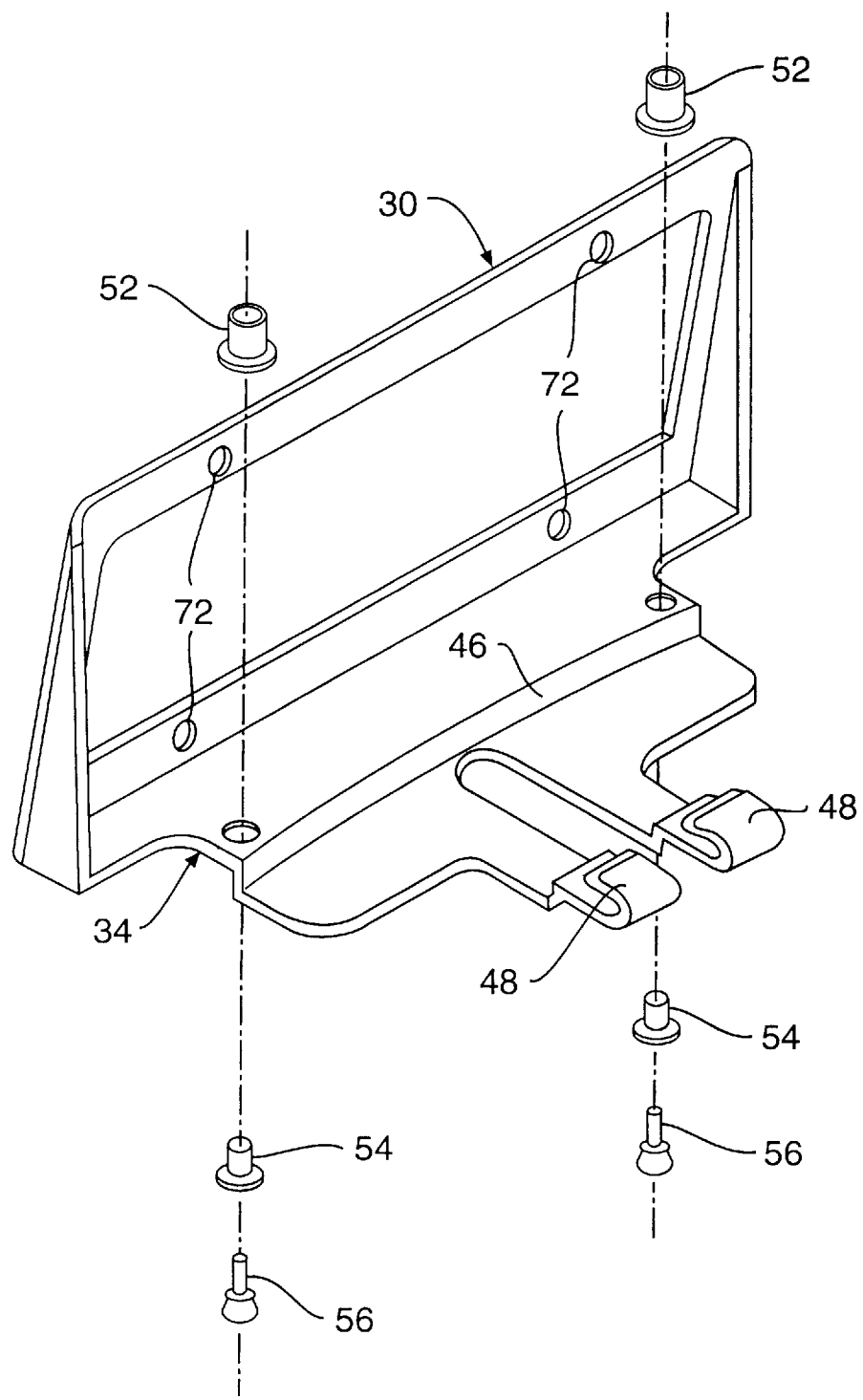
FIG. 4 is a perspective view of a further embodiment of the invention.

The bracket 30 of the embodiment illustrated in FIGS. 2 and 3 is specifically adapted to fit a class of vehicles comprising LEXUS® SC-300 and SC-400 model cars sold in the United States by the LEXUS division of Toyota Motor Sales, U.S.A., Inc. The configuration can be adapted to other vehicles as well. For example, FIG. 4 illustrates a bracket adapted to fit a LEXUS ES-300 model also marketed by that company, the difference being in the configuration of the tabs 48 which are provided with a configuration adapted to capture an edge of a flange structure (not shown) under a bumper of the LEXUS ES-300 model (not shown) instead of the slotted tabs 44 provided on a bracket intended for the SC models.

The license plate mounting bracket 30 of the invention can be formed by conventional manufacturing techniques of conventional materials. For example, a lightweight, thermoplastic material can be used, such as a filled natural rubber or synthetic polymeric resin, specifically, a filled butyrate may be used. Composite materials such as fiber reinforced thermoplastics, as well as filled and composite thermosetting plastics, and metals such as steel and aluminum will be recognized as additional examples of viable materials by those skilled in the art.

Figure 5A:
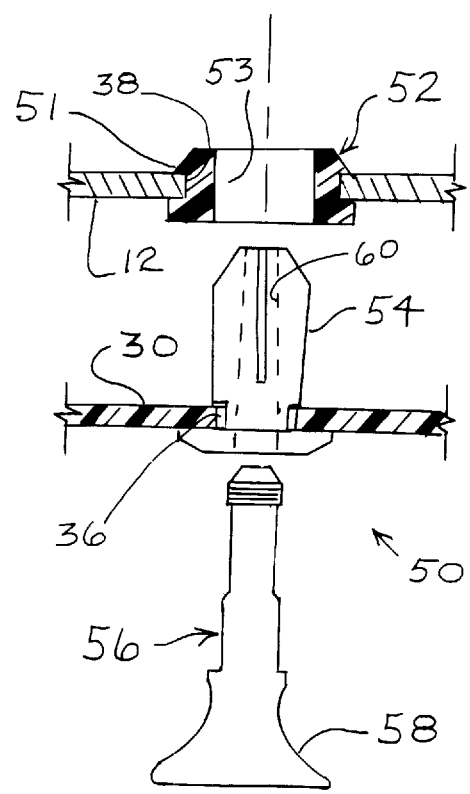
FIG. 5a is an elevational view, partially in section, showing an embodiment of a releasable attachment system of the invention before attachment.
Figure 5B:
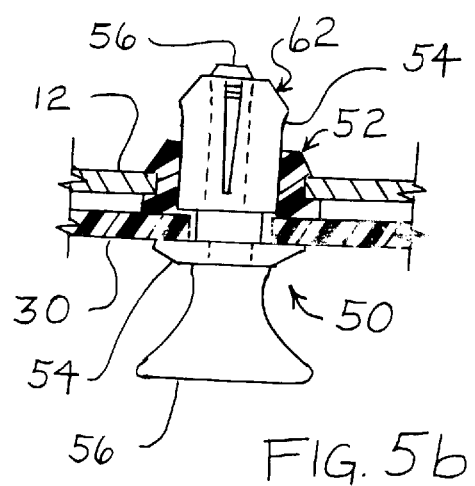
FIG. 5b is a elevational view, partially in section, of the attachment system of FIG. 5a after attachment.

Referring now to FIG. 5a and FIG. 5b, an embodiment of the fastener system 50 of the invention will be explained in more detail. A snap-in plastic bushing 52 formed of nylon for example, is inserted in a hole 38 in a bottom surface of a vehicle bumper 12 or other member and holds itself there by means of locking finger 51. For example, in the illustrated embodiment such a bushing could be a HEYCO® snap bushing having an inside diameter of approximately 6.4 millimeters and an approximately 9.5 millimeter working outer diameter measurement, corresponding to a mounting hole diameter measurement of approximately the same size. This and other sized bushings are commercially available from Heyco Molded Products, Inc. of Kenilworth, N.J. for example.

The nylon plunger 56 is inserted into the hole in plastic grommet 54 and is captively held therein. The plastic grommet 54 is inserted into the hole 36 in the mounting bracket 30 to be aligned with the hole 53 in the snap bushing 52 previously mounted in the hole 38 in the vehicle bumper 12. The grommet is formed of a plastic, such as polycarbonate or polysufone for example, and is self-retaining in the hole 36 and remains loosely attached therein to the bracket 30 after insertion. The grommet is intended to cooperate with a nylon plunger 56 which can be fully inserted within it to expand the grommet radially outward. Such grommet and plunger combinations form a quick release fastener assembly and are commercially available from Hartwell Commercial of Placentia, Calif., marketed under the name of NYLATCH® quick release fasteners. The grommet in this example is chosen so as to have a 6.4 millimeter outside working diameter to fit within the snap bushing 52. The grommet is split longitudinally in 3 places, and is intended to be radially compressible and expandable for insertion into hole 36 and bushing 52 and retention in the bushing by radially compressive forces. As will be appreciated, fasteners formed of other materials, or manufactured by others, can be substituted as long as the functionality and cooperation of the fastener and bushing are preserved. This is true for all fasteners discussed, herein.

Figure 7:
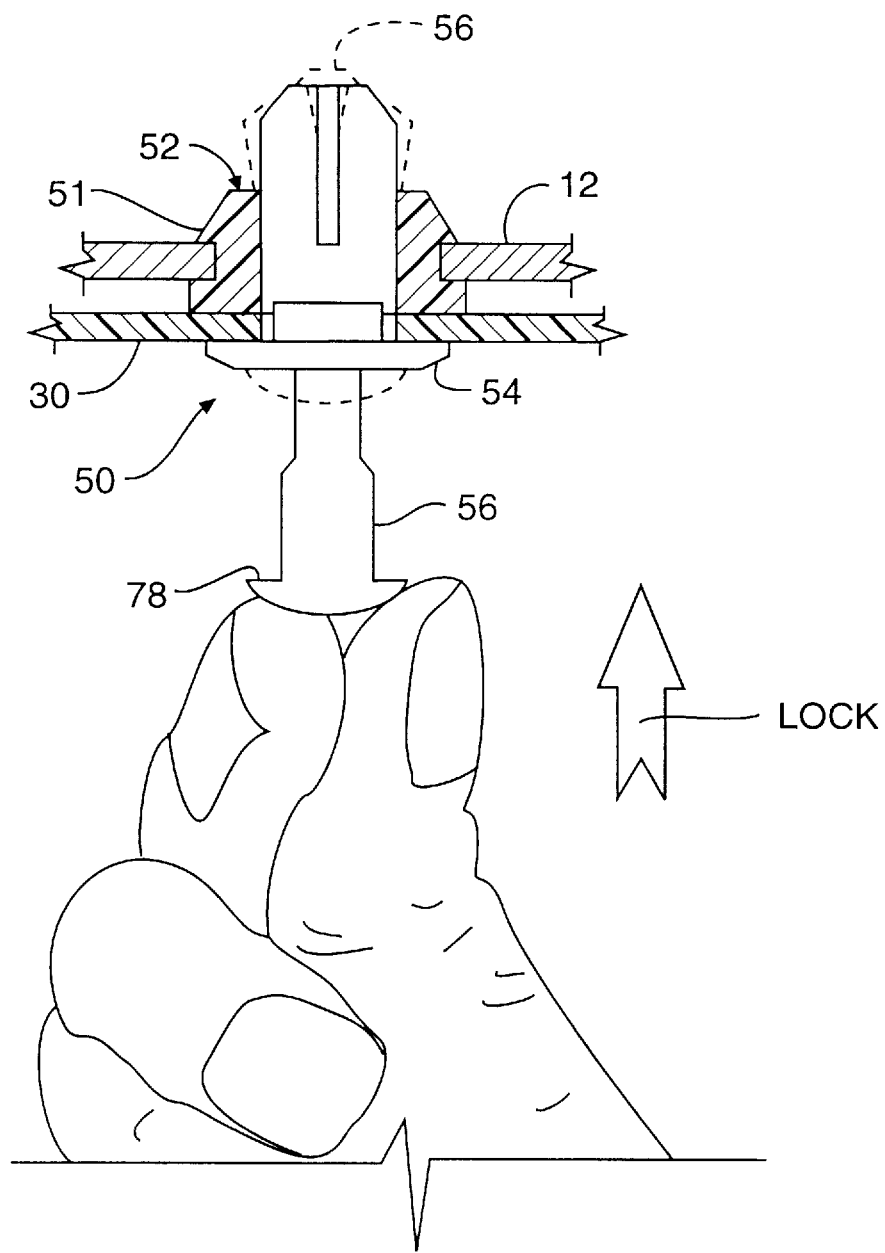
FIG. 7 is an elevational view, partially in section, of a further embodiment of the invention before and after fastening.
Figure 8A:
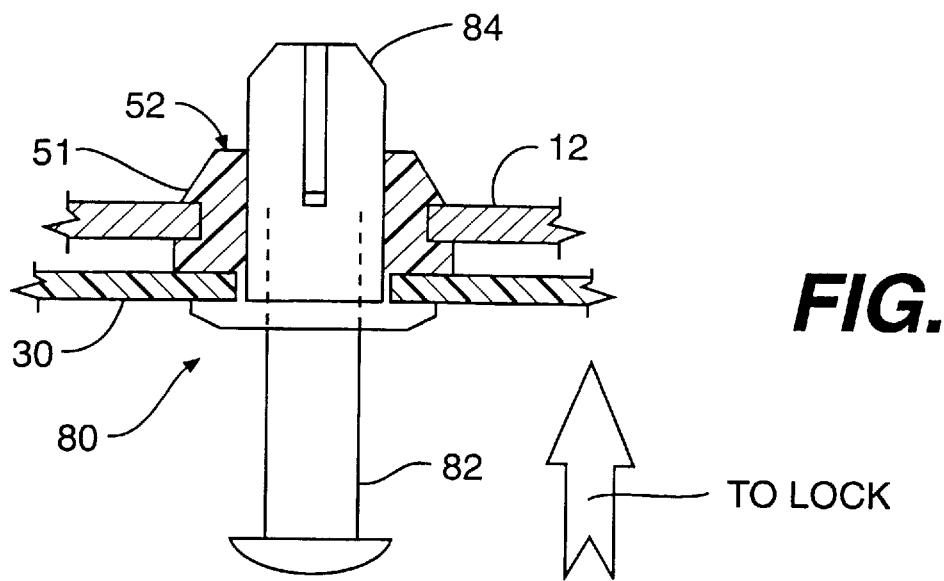
FIG. 8a illustrates a further embodiment of the invention where the fastener is joined but not locked.
Figure 8B:
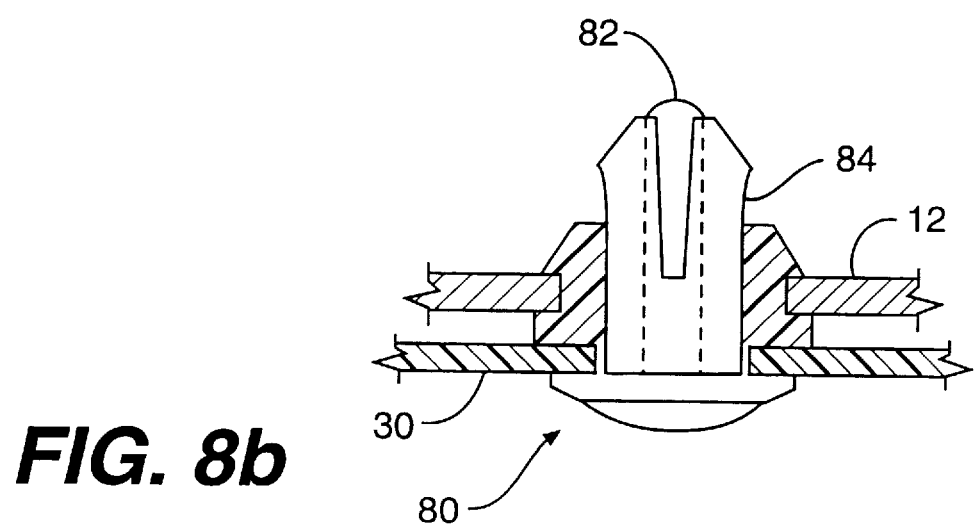
FIG. 8b illustrates the embodiment of FIG. 8a in a locked position.

The plunger 56 has a graspable proximal portion 58 adapted to be grasped manually for insertion and retraction from the grommet 54. The plunger, once inserted into the grommet, is captively held therein, so the plunger is thereafter never fully retracted in ordinary operation, but can be retracted to a point where it is held in the grommet but does not expand it. This concept is illustrated in FIGS. 7, 8a and 8b. Returning to FIGS. 5a and 5b, the bracket 30 is moved upwards so that the grommet 54 is inserted in the bushing 52. When the plunger is fully inserted, the grommet is expanded radially against the inner surface 53 of the bushing. The bushing 52 is already captively held in the hole 38 in the vehicle 14 by the locking fingers 51 of the bushing 52. Due to a tapering inner sleeve 60 configuration of the grommet 54, the grommet at a distal end 62 expands radially to a diameter size beyond that of the inner diameter of the bushing 52. Depending on relative ages and materials used, the bushing in turn may deform somewhat and press out radially against the hole 38 in the bottom bumper surface 12 to provide a snug fit and solid feel. This is particularly true when considerable outward radial force is applied by insertion of the plunger 56, and drive rivets (discussed below) may also be used to apply such force. Therefore by a combination of frictional and mechanical engagement and interference fit, the fastener securely attaches the mounting bracket 30 to the bottom of the bumper 12 when the grommet is placed within the bushing and the plunger thereafter is fully inserted into the grommet.

Figure 6:
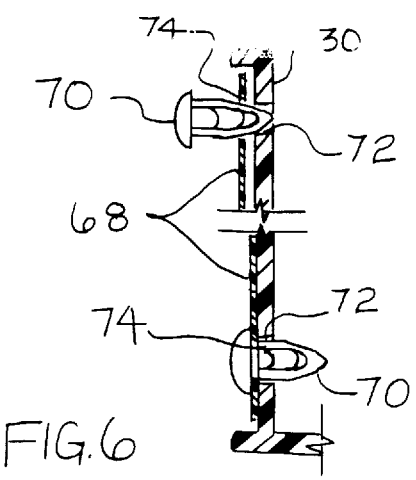
FIG. 6 is an elevational view, partially in section, of an embodiment of the attachment between a license plate and a mounting bracket of the invention.

Referring now to FIG. 6, the attachment of a license plate 68 to the mounting bracket 30 is accomplished in the illustrated embodiment by fasteners 70 which can be inserted by hand through holes 72 in the mounting bracket as well as corresponding holes 74 in said license plate without the use of tools. A variety of fasteners are commercially available which when properly selected as to size and material will perform this function. For example, HEYCO® Nylon Arrow Clips, available from Heyco Molded Products, Inc. of Kenilworth, N.J. have been found to work for this purpose and are shown in FIG. 6. Also, HEYCO Nylon Push-In Fasteners, available from that company could be substituted. Additionally, CHRISTMAS TREES® Clips, CANOE® Clips, and STALOK® Fasteners, available commercially from ITW Fastex, Inc. of Wood Dale, Ill., and Finned Fasteners, Part No. PF8-20, Removable Fasteners, Part No. CF8-20, and Push Fasteners, Part No. PF8-11 sold by Rodon Corporation of Hatfield, Penn. are additional examples of such fasteners. Those skilled in the art will recognize that other fasteners which are fastenable without tools could be used. Also, fasteners requiring tools to install could alternatively be used, but since fasteners which can be installed by hand but can only be removed using tools are available, as will be discussed, either removable or more permanent attachments can be effected by hand without tools the later types offer an advantage in convenience to the user.

Referring now to FIG. 7, a different head configuration of the fastener 50 described above in connection with FIGS. 5a and 5b could be used to attach the license plate holder bracket 30 to the bottom surface 12 of a portion of a vehicle 14. The fastener being otherwise as described above, simply selecting a different head configuration of a proximal portion 78 of the plunger 56 of the fastener 50 so that it cannot be grasped by hand after it has been pushed into the grommet 54 renders the attachment permanent, or more precisely, removable only with considerable effort and requiring tools. Such a connection may be desirable in most applications where ease of transfer of the license plate mounting bracket 30 is not particularly desirable. Also, sized differently, such a connector could be used to attach a license plate (not shown) to the mounting bracket.

Turning now to FIGS. 8a and 8b, a further alternative embodiment makes use of a fastener 80 that does require considerable force to fasten, and therefore may require use of a tool (not shown), but is not specific as to the tool required, and is therefore still quite convenient. For example, a nylon drive rivet 80, such as that illustrated, is currently marketed by Heyco Molded Products, Inc. mentioned above, Heyco Part No. 2588 being typical. In this embodiment the plunger 82 is driven into the grommet 84, but no provision for removal without considerable effort is provided.

It is unlikely that enough force to drive the plunger 82 into the grommet 84 could be exerted by an average user using only the hands. However, since driving the plunger in requires simply a concentration of force, in most cases simply placing a solid object (not shown) between the hand(s) and the plunger will allow sufficient force to be applied without undue discomfort to the user. Of course, blunt striking implements or solid objects of suitable size (not shown) could be used to drive plunger 82 into the grommet 84 by one or more blows directed by a user.

Figure 9:
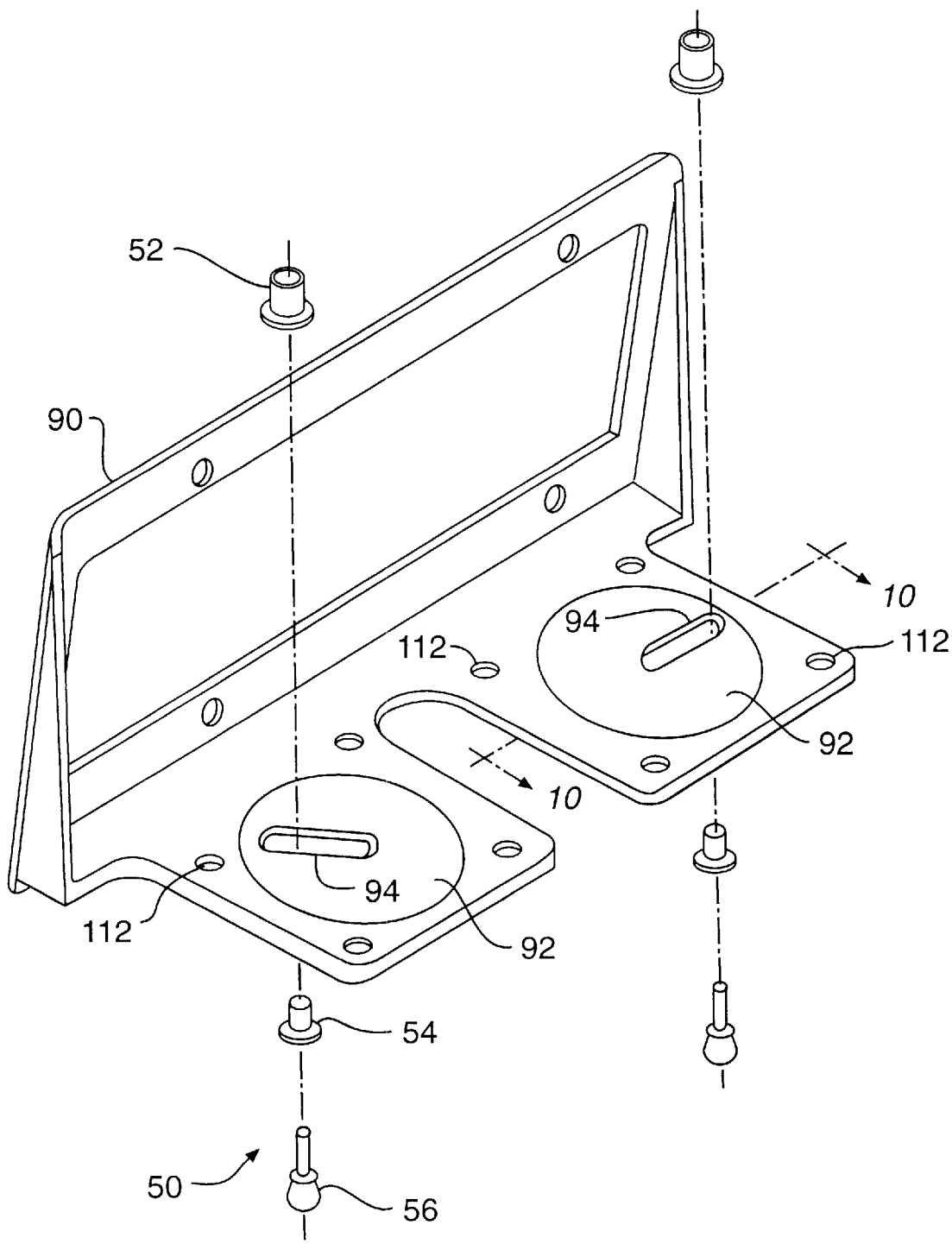
FIG. 9 illustrates a further embodiment of the license plate mounting system of the invention having adjustable fastener locations.
Figure 10:
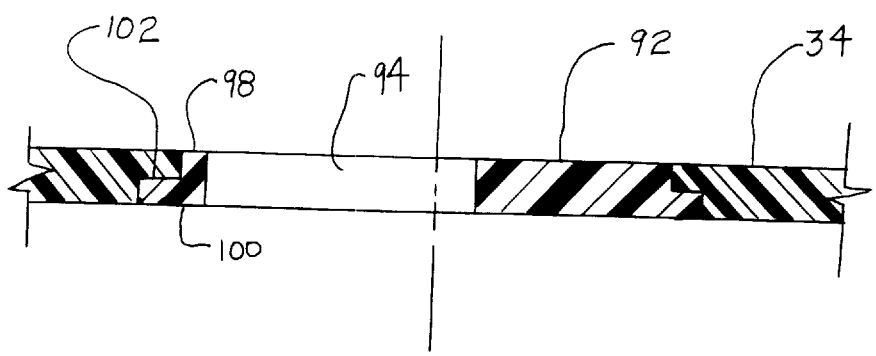
FIG. 10 is an elevational view, partially in section, of a portion of the mounting bracket of the invention illustrated in FIG. 9, taken along line 10—10 in FIG. 9.
Figure 11:
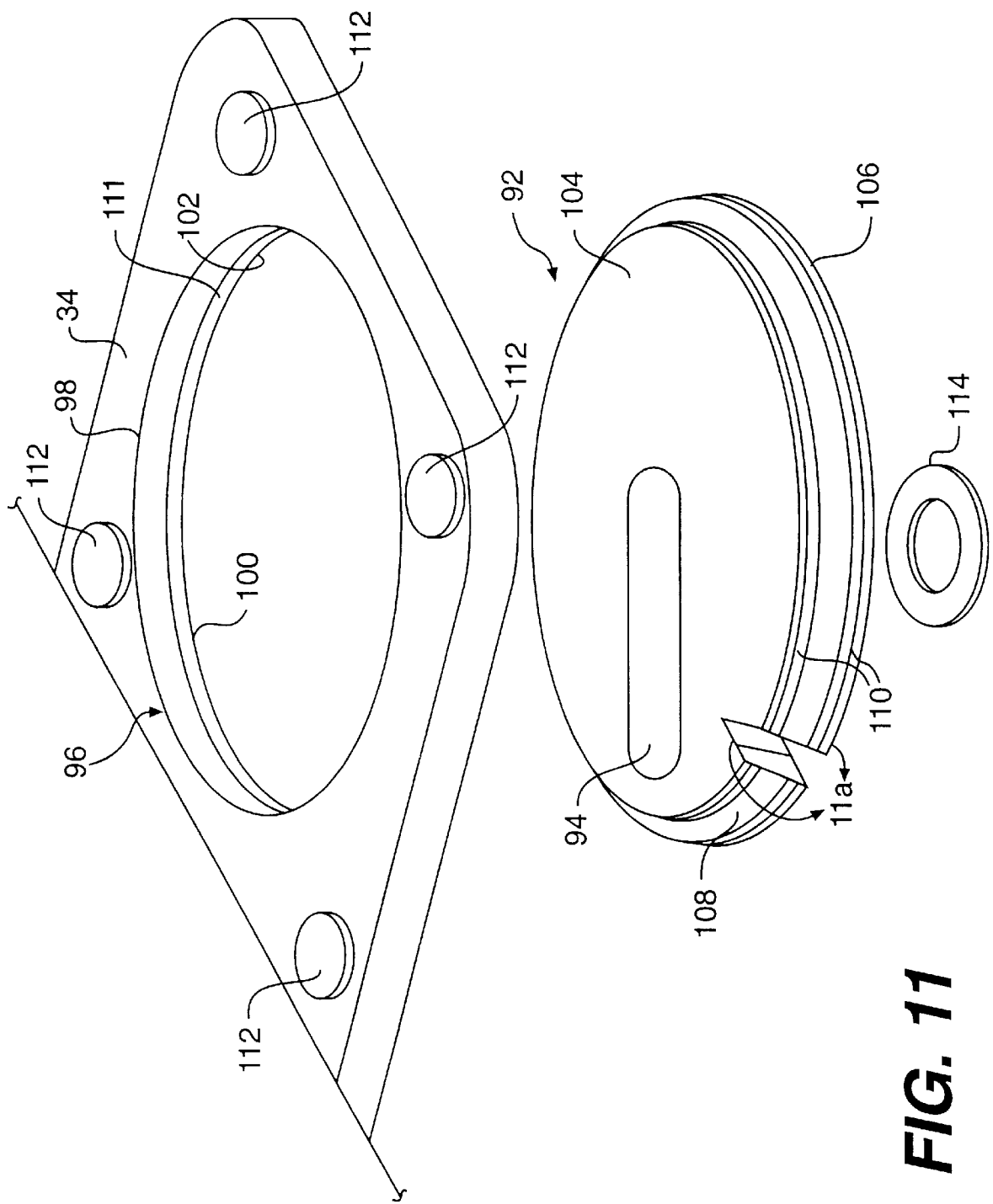
FIG. 11 is an exploded perspective view of a portion of the mounting bracket of the invention illustrated in FIG. 9 showing details of an adjustment portion.

As shown in FIGS. 9, 10 and 11 in a further alternate embodiment, the license plate bracket 90 is configured to allow adjustment of the location of the fasteners 50 to align with existing holes in a bottom surface of body or grillework or the bumper of a variety of vehicles (not shown). Additionally this configuration allows attachment of the bracket to a bottom surface without holes in a convenient manner, as new holes can be drilled without the careful measurements required to assure proper alignment of a conventional bracket.

Differing from the previously described embodiments, the horizontal flange 34 of the mounting bracket 90 has incorporated therein a rotatable disk having a slotted opening 94 defined therethrough extending from the center of the disk to its periphery. This rotatable disk can be adjusted to turn the slot to align with a hole in a vehicle (not shown) for mounting purposes. In the illustrated embodiment, two such rotatable disks are provided in the horizontal flange of the mounting bracket, and considerable latitude in the location of the mounting holes in a vehicle to which it will be mounted is accommodated.

In more detail, the particular embodiment of an adjustable mounting bracket 90 illustrated has two circular openings 96 defined in the horizontal flange 34 having stepped configuration defined by an upper portion 98 of smaller diameter, and a lower portion 100 of larger diameter, and a bearing surface 102 therebetween. The rotatable disk 92 is given a corresponding configuration with an upper portion 104 of smaller diameter sized to fit within upper portion 98 of the circular opening 96 and a lower portion 106 sized to fit within the lower portion 100 of the circular opening. A bearing surface 108 therebetween bears against bearing surface 102 in the flange 34 of the bracket 90.

It will be appreciated that it is desirable to retain the rotatable disk 92 within the circular opening 96. Numerous ways to do this are known, for example in the illustrated embodiment a small bead 110 is incorporated in the edge of the disk 92, and a small corresponding indentation 111 is provided in the bracket 90 around the periphery of the circular opening 96. These indentation and bead features are made small enough so as not to interfere with molding processes unduly, yet large enough to retain the disk 92 in the bracket 90 during typical installation procedures.

Since, as will be apparent, in this embodiment force is transferred across the bearing surfaces 102, 108 it is most important that the bracket 90 tightly abuts the surface of the vehicle (not shown) to which it is mounted. Since the snap bushings before described and illustrated do protrude a small distance below the surface of the bumper or other feature of the vehicle spacers 112 can be incorporated in the flange 34 of the bracket 90 to contact the vehicle. These may be unitary with the bracket and formed of the same material, or could be formed of differing material, such as an elastomeric material to protect paint and provide shock and vibration absorption, bonded conventionally to the flange 34.

Also, it is desirable that the slot 94 terminates sufficient distance from the periphery of the disk 92 that bearing strength is maintained. A washer 114 can be used between the fastener 50 and the disk 92 to further distribute forces acting on the components.

From the forgoing it will be appreciated that the license plate mounting system of the present invention allows license plates 68 to be conveniently mounted to vehicles 14 with or without tools. Also depending on preference, a manually releasable, and therefore conveniently transportable, mounting can be effected, as well as alternatively a more permanent one that cannot be released without tools and significant effort. Moreover, the mounting system of the invention allows mounting and removal of a license plate without leaving unsightly holes in the vehicle where they can be seen after the license plate mounting bracket is removed, which is of concern to vehicle owners and operators.

While several particular forms of the invention have been described, it will be apparent that various modifications can be made without departing from the spirit and scope of the invention.

What is claimed is:

1. A license plate mounting bracket system adapted to mount a license plate to a selected vehicle, comprising:
   an one-piece unitary bracket adapted to receive said license plate, having a top side, front and back sides and a bottom side, and a non-rotatable, rigidly secured flange portion extending rearwardly from said back side thereof having an opening therein adapted to align with an opening in a bottom surface of a portion of said selected vehicle, said bottom surface portion of said vehicle adapted to not be readily viewable under normal conditions of standing or crouching in front of said vehicle;
   a fastener system, further comprising a bushing to be inserted in said opening in the bottom surface of a portion of said selected vehicle, an expandable grommet inserted in said opening in said bracket adapted to align with said opening in said vehicle, and a plunger adapted to expand said grommet when inserted therein, which may be fastened manually without the use of tools; whereby the license plate may be mounted to said selected vehicle without the need to drill openings in normally viewable portions of said vehicle, and such mounting may be accomplished by hand without the use of tools by inserting said bushing into said opening of said vehicle, and said grommet into said bracket, then inserting said grommet into said bushing, and thereafter inserting said plunger into said grommet to expand said grommet, said grommet also expanding into said bushing to seat firmly in said bushing wherein when the bracket is assembled to said vehicle, the back side of said bracket is adapted to be spaced from said vehicle to prevent contact with the vehicle.

2. The license plate mounting system of claim 1, wherein the opening in said flange of said bracket is adjustable to accommodate a variety of existing hole patterns.

3. The license plate mounting system of claim 2, further comprising a rotatable disk interlocked within said flange of said bracket so as to be rotatable, but which is prevented from being pulled upwards through the flange with which it is interlocked, so as to be able to transmit a compressive force to said flange to press it against said underside of a component of said vehicle to mount said bracket firmly thereto, said rotatable disk further comprising a surface defining a radially directed slot therein from a center portion of said disk to a peripheral portion thereof, said slot defining said hole in said flange adapted to align with an existing hole in a bottom surface of a portion of a selected vehicle, whereby rotation of the disk allows said hole to be aligned with holes in differing vehicles.

4. The license plate mounting system of claim 1, wherein the location of said opening in said flange portion of said bracket is made to coincide with said opening of said selected vehicle when said bracket is placed in a desired location and orientation with respect to said selected existing vehicle, and said flange portion is shaped so as to interfit with said selected vehicle at said desired location to provide stabilization of said bracket, wherein said bushing is captively held in said opening of said vehicle to provide non-deformable interface between deformable opening of said vehicle and said expandable grommet.

5. The license plate mounting system of claim 4, wherein said flange portion is shaped to interfit between an underlying horizontal surface of said vehicle with holes therein, and grillwork underneath a front bumper of said selected vehicle.

6. The license plate mounting system of claim 1, wherein said expandable grommet is releasable from said bushing by hand without the use of tools.

7. The license plate mounting system of claim 1, wherein said expandable grommet is not releasable from said bushing by hand without the use of tools.

8. The license plate mounting system of claim 1, further comprising a fastener adapted to be inserted through said license plate into said bracket to retain said license plate against said bracket, which can be fastened manually without the use of tools.

9. A license plate mounting bracket system adapted to mount a license plate to a selected vehicle, comprising:
 a one-piece unitary bracket adapted to receive the license plate, having a top side, front and back sides and a bottom side, and a non-rotatable, rigidly secured flange portion extending rearwardly from the rear side thereof having an opening therein adapted to align with an existing opening in a bottom surface of a portion of the selected vehicle, said bottom surface of said vehicle adapted to not be readily viewable under ordinary circumstances, said flange portion being adapted to abut said vehicle to stabilize said bracket;
 a fastener system, further comprising a bushing to be inserted in said existing opening, an expandable grommet inserted in said opening in said bracket adapted to align with said existing opening in said vehicle, and a plunger adapted to expand said grommet when inserted therein, which can be fastened manually without the use of tools;
 a fastener adapted to be inserted through said license plate into said bracket to retain said license plate against said bracket; whereby said license plate can be mounted to said selected vehicle without the need to drill unsightly openings in normally viewable portions of said vehicle, and such mounting can be accomplished by hand without the use of tools by inserting said bushing into said opening, and said grommet into said bracket, then inserting said grommet into said bushing, and thereafter inserting said plunger into said grommet to expand said grommet, said grommet also expanding into said bushing to seat firmly in said bushing.

10. The license plate mounting bracket system of claim 9, wherein the fastener mounting said bracket to said vehicle is releasable by disengaging said plunger from said grommet far enough to allow said expandable grommet to shrink to a size wherein said grommet can pass through an inner opening of said bushing inserted in a hole in an underside of a portion of said vehicle.

11. The license plate mounting system of claim 9, wherein the opening in said flange of said bracket is adjustable to accommodate a variety of existing hole patterns.

12. The license plate mounting system of claim 9, wherein said fastener cannot be released by hand without the use of tools.

13. A license plate mounting bracket system adapted to mount a license plate to a selected vehicle having a horizontal surface thereon oriented so as to face downwardly and be hidden from view to a vehicle operator in ordinary day-to-day operation of said vehicle, comprising:
 a one piece unitary mounting bracket having a front side and a back side, adapted to receive said license plate to display said license plate on said front side thereof and fasteners to attach said license plate thereto, and means for limiting translational and rotational movement of the mounting bracket extending rearwardly therefrom and configured to solidly abut said selected vehicle beneath said horizontal, downwardly-facing surface;
 a fastener to attach said mounting bracket to said vehicle at such downwardly-facing horizontal surface; whereby, said bracket is mounted to said vehicle and abuts said vehicle so as to prevent translational and rotational movement, and can be removed without leaving openings visible in the ordinary day-to-day operation of said vehicle.

14. The license plate mounting system of claim 13, wherein said fasteners are releasable by hand without the use of tools.

15. The license plate mounting system of claim 13, wherein said fasteners are not releasable by hand without the use of tools.

16. The license plate mounting system of claim 13, wherein said fastener is adapted to be inserted through said license plate and into said mounting bracket to retain said license plate against said mounting bracket, which can be fastened manually without the use of tools.

17. A license plate mounting bracket system adapted to mount a license plate to a vehicle having a downward facing surface, comprising:
 a one-piece unitary mounting bracket having a front side, a back side, a top side, and a bottom side, adapted to retain said license plate for display of said license plate so as to be viewable from said front side of said bracket and having a non-rotatable, rigidly secured flange portion extending rearwardly from said back side thereof adapted to interfit with said vehicle to prevent relative translational and rotational movement between said bracket and said vehicle, adapted to abut said downwardly facing surface on said vehicle and having a radially expandable fastener extending through an opening in said flange portion, said fastener being expandable by manual actuation from said bottom side of said bracket;
 a bushing adapted to interfit with said fastener, said bushing being adapted to be inserted in an opening in said downwardly facing surface of said vehicle, and to be retained therein;
 whereby said bracket is mounted to said vehicle by insertion of said fastener into said bushing, and thereafter manually actuating said fastener to radially expand said fastener within said bushing, to interlock the fastener with said bushing to retain said fastener therein, said mounting bracket thereby firmly attached to said vehicle.

18. The license plate mounting bracket system of claim 17, wherein said flange portion is configured to engage said vehicle by a slot therein, to prevent translational movement of said flange portion in at least one direction, and to prevent rotational movement of said bracket about an axis through said fastener.

* * * * *